United States Patent
Morris

(10) Patent No.: US 9,714,584 B2
(45) Date of Patent: Jul. 25, 2017

(54) BEARING SUPPORT DAMPING

(71) Applicant: United Technologies Corporation, Hartford, CT (US)

(72) Inventor: Robert J. Morris, Portland, CT (US)

(73) Assignee: United Technologies Corporation, Hartford, CT (US)

( * ) Notice: Subject to any disclaimer, the term of this patent is extended or adjusted under 35 U.S.C. 154(b) by 74 days.

(21) Appl. No.: 14/742,766

(22) Filed: Jun. 18, 2015

(65) Prior Publication Data

US 2016/0369652 A1  Dec. 22, 2016

(51) Int. Cl.

| F16C 27/04 | (2006.01) |
|---|---|
| F01D 25/16 | (2006.01) |
| F16C 19/52 | (2006.01) |
| F01D 25/18 | (2006.01) |
| F16F 15/02 | (2006.01) |
| F16F 9/30 | (2006.01) |
| F16C 35/077 | (2006.01) |
| F16C 19/16 | (2006.01) |
| F16C 27/06 | (2006.01) |

(52) U.S. Cl.
CPC ........... *F01D 25/164* (2013.01); *F01D 25/18* (2013.01); *F16C 19/527* (2013.01); *F16C 27/045* (2013.01); *F16F 9/30* (2013.01); *F16F 15/02* (2013.01); *F05D 2220/32* (2013.01); *F05D 2240/50* (2013.01); *F16C 19/163* (2013.01); *F16C 27/066* (2013.01); *F16C 35/077* (2013.01); *F16C 2360/23* (2013.01)

(58) Field of Classification Search
CPC ........ F16C 27/04; F16C 27/045; F16C 27/06; F16C 35/077
See application file for complete search history.

(56) References Cited

U.S. PATENT DOCUMENTS

| 3,709,570 | A | * | 1/1973 | Galbato | .................. F16C 27/04 |
|---|---|---|---|---|---|
|  |  |  |  |  | 267/161 |
| 4,084,861 | A | * | 4/1978 | Greenberg | ............ F01D 25/164 |
|  |  |  |  |  | 384/105 |
| 4,693,616 | A |  | 9/1987 | Rohra et al. |  |
| 4,872,767 | A |  | 10/1989 | Knapp |  |
| 4,971,457 | A |  | 11/1990 | Carlson |  |
| 5,088,840 | A |  | 2/1992 | Radtke |  |

(Continued)

FOREIGN PATENT DOCUMENTS

EP  1396611 A2  3/2004

OTHER PUBLICATIONS

Extended European Search Report for EP Application No. 16175128.4, dated Sep. 5, 2016, 8 pages.

*Primary Examiner* — Phillip A Johnson
(74) *Attorney, Agent, or Firm* — Kinney & Lange, P.A.

(57) ABSTRACT

A damping treatment is applied to the ligaments of a squirrel cage type bearing support. The damping treatment reduces the vibrations transmitted to the engine casing as the engine passes through various resonance frequencies of the various parts of the gas turbine engine. A squeeze-film damper damps engine vibrations, but the oil in the squeeze-film damper can act as a stiffener during certain operational ranges, which increases the transmission of vibrations to the engine structure. Applying a damping treatment to the ligaments of the squirrel cage provides effective vibration damping.

17 Claims, 3 Drawing Sheets

(56) References Cited

U.S. PATENT DOCUMENTS

| | | | |
|---|---|---|---|
| 5,110,257 A * | 5/1992 | Hibner | F01D 25/164 415/119 |
| 5,452,577 A * | 9/1995 | Langer | F01N 1/24 181/252 |
| H1864 H * | 10/2000 | Demoret | F16F 9/306 29/897.35 |
| 6,135,639 A | 10/2000 | Dede | |
| 6,679,045 B2 | 1/2004 | Karafillis et al. | |
| 7,427,186 B2 | 9/2008 | Gerez et al. | |
| 7,524,112 B2 | 4/2009 | Gerez et al. | |
| 7,857,519 B2 | 12/2010 | Kostka et al. | |
| 8,083,413 B2 | 12/2011 | Ertas | |
| 8,182,153 B2 | 5/2012 | Singh et al. | |
| 2002/0067871 A1 * | 6/2002 | Bos | F16C 27/045 384/99 |
| 2005/0214505 A1 * | 9/2005 | Deakin | C23C 4/02 428/116 |
| 2008/0152483 A1 | 6/2008 | Godleski | |
| 2013/0051982 A1 | 2/2013 | Hindle et al. | |

* cited by examiner

BEARING SUPPORT DAMPING

BACKGROUND

The present invention relates to gas turbine engines. More particularly, the present invention relates to vibration damping for a bearing support assembly for a gas turbine engine.

Squeeze film damping can be used in a bearing support assembly that supports a rotatable shaft of a gas turbine engine. The bearing is contained within a stationary housing. A bearing centering spring, also known as a squirrel cage, supports the bearing. The squirrel cage is connected to the stationary housing such that the squirrel cage does not rotate relative to the stationary housing, yet the squirrel cage is flexible enough to bend in response to loads experienced from the bearing. A film of liquid, such as oil, is supplied to an annulus disposed between the stationary housing and the squirrel cage. The film of oil reduces or damps engine vibration and the transmission of vibrations from the bearing to the engine structure.

When the compressor or turbine shaft rotates, imbalance or rotor instabilities can cause excessive whirling of the shaft and vibration of the engine, engine mounts and airframe. As a speed of the shaft increases, the rotating shaft passes through a variety of critical speeds, which occur when the speed of the rotating shaft traverses a resonant frequency of one of the various structures of the engine. Due to the multitude of structures that make up any given engine, the rotating shaft passes through several critical speeds as the rotating shaft accelerates. As the rotating shaft rotates, the rotating shaft may be displaced from a centerline of the engine. The rotating shaft then whirls about a centerline of the engine. As the bearing moves with the rotation of the shaft, the squirrel cage vibrates within the stationary housing and squeezes the oil in the annulus. Squeezing the oil in the annulus creates a pressure wave that may comprise a damping force, when the oil shears at an angle orthogonal to the displacement of the shaft from the engine centerline, or a stiffness force, when the oil shears along the direction of displacement or opposite the direction of displacement. When the oil acts as a stiffener, the oil actually increases the transmission of vibrations to the engine and airframe structure. In such a case, the vibrations experienced by the bearing assembly must be damped in another manner.

SUMMARY

According to an embodiment of the present disclosure, a squirrel cage includes a first end, a second end, a plurality of ligaments extending between and connecting the first end and the second end, and a damping layer disposed on at least one of the plurality of ligaments.

According to another embodiment of the present disclosure, a damping assembly includes a bearing, a squirrel cage disposed radially outward of and supporting the bearing, and a housing disposed radially outward of the squirrel cage. The squirrel cage includes a first end, a second end supporting the bearing, a plurality of ligaments extending between and connecting the first end and the second end, and a damping layer disposed on at least one of the plurality of ligaments.

According to yet another embodiment of the present disclosure, a method of damping vibration in a gas turbine engine includes damping engine vibrations with a damping layer disposed on at least one ligament of a squirrel cage, the squirrel cage supporting a bearing outer race; supplying oil to an annulus disposed between the squirrel cage and a housing; damping engine vibrations with the oil; and switching off an oil supply to the annulus when the engine speed is at least at idle speed of the engine, whereby the engine vibrations transmitted through the bearing outer race are damped exclusively by the squirrel cage.

DETAILED DESCRIPTION

Figure 1:
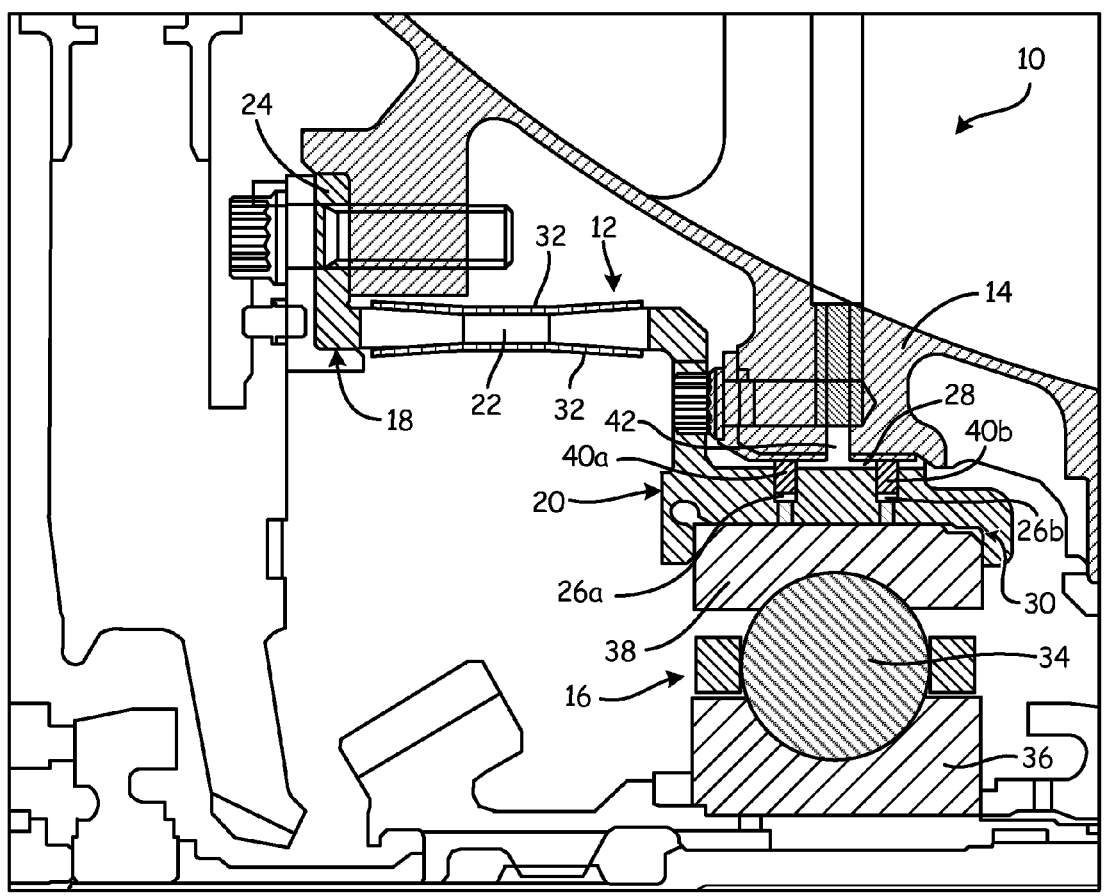
FIG. 1 is a cross-sectional view of a bearing support assembly.

FIG. 1 is a cross-sectional view of bearing support assembly 10. Bearing support assembly 10 includes squirrel cage 12, stationary housing 14, bearing assembly 16. Squirrel cage 12 includes first end 18, second end 20, and ligaments 22. First end 18 includes mounting flange 24. Second end 20 includes piston ring grooves 26a and 26b, annulus 28, and race housing 30. Ligaments 22 include damping layer 32. Bearing assembly 16 includes bearing element 34, inner race 36, and outer race 38. Bearing support assembly 10 further includes piston rings 40a and 40b and oil supply passage 42.

Ligaments 22 extend between and connect first end 18 and second end 20. Mounting flange 24 extends radially outward from ligaments 22. Mounting flange 24 includes a plurality of fastener openings therethrough, the fastener openings are configured to receive fasteners for securing squirrel cage 12 to stationary housing 14. Piston ring grooves 26a and 26b extend circumferentially about an outer surface of second end 20. Annulus 28 similarly extends circumferentially about an outer surface of second end 20, and annulus 28 is disposed between piston ring groove 26a and piston ring groove 26b. Race housing 30 extends circumferentially about an inner surface of second end 20.

Squirrel cage 12 is supported by stationary housing 14. A fastener, such as a bolt, extends through stationary housing 14 and mounting flange 24 to secure squirrel cage 12 to stationary housing 14. During engine operation, squirrel cage 12 does not rotate about an axis of the engine. Ligaments 22 extend between first end 18 and second end 20 and provide flexible support to allow squirrel cage 12 to vibrate within stationary housing 14. In this way, squirrel cage 12 is cantilevered and supports bearing assembly 16.

Race housing 30 supports outer race 38 of bearing assembly 16. Bearing element 34 is rotatably disposed between inner race 36 and outer race 38. Bearing assembly 16 can support a rotatable shaft (not shown), such as a compressor or turbine shaft of a gas turbine engine. Passage 42 supplies oil to annulus 28. Bearing assembly 16 is generally a thrust bearing, which is a bearing that can support both a radial and axial load. While bearing assembly 16 is preferably a thrust bearing, bearing assembly 16 may be a roller bearing or any other suitable bearing for supporting the rotating shaft. In addition, while bearing assembly 16 is illustrated as including a spherical bearing element 34, bearing element 34 could be a roller or any other suitable shape for supporting the load of the rotating shaft.

Piston rings 40a and 40b are disposed on either side of annulus 28 in piston ring grooves 26a and 26b respectively. Passage 42 extends through stationary housing 14 and is fluidly connected to annulus 28 to supply oil to annulus 28. Passage 42 includes a valve (not shown) for selectively controlling the supply of oil to annulus 28. The oil in annulus 28 is held between squirrel cage 12, piston rings 40a and 40b, and stationary housing 14. In this way, bearing support assembly 10 includes a squeeze-film damper, whereby the oil disposed in annulus 28 damps vibrations to reduce the rotor vibration and the transmission of vibrations from bearing assembly 16 to stationary housing 14. As the shaft rotates, vibrations experienced by the shaft are transmitted to stationary housing 14 through bearing assembly 16. Due to the motion of the shaft, squirrel cage 12 vibrates within stationary housing 14. The motion of squirrel cage 12 squeezes the oil in annulus 28, and the oil in annulus 28 reduces the vibrations experienced from the rotating shaft.

As the rotating shaft accelerates, the rotating shaft passes through several critical speeds. A critical speed is experienced when a rotational frequency of the rotating shaft traverses a resonance frequency of one of the various structure of the engine. Due to the variety of structures that make up any given engine, the rotating shaft can pass through a multitude of critical speeds during acceleration. As the rotating shaft rotates, a centerline of the rotating shaft may be displaced from a centerline of the engine. When displaced, the rotating shaft whirls about the centerline of the engine, thereby squeezing the oil disposed within annulus 28. Squeezing the oil generates a rotating pressure wave, which may comprise a stiffness force and a damping force. A shear angle of the oil determines the damping or stiffening properties exhibited by the oil. The shear angle is an angle of the rotating pressure wave to the direction of displacement between the centerline of the rotating shaft and the centerline of the engine. The shear angle is affected by parameters such as the annulus diameter, the annulus length, the clearance between the outer race and the housing, and the oil viscosity. To effectively reduce or damp engine vibrations, the oil disposed within annulus 28 preferably has a shear angle of about 90 degrees. The shear angle is at about 90 degrees when the rotating pressure wave is orthogonal to the direction of displacement between the centerline of the rotating shaft and the centerline of the engine.

However, the squeeze-film damper can generate stiffness where the shear angle is closer to about 0 degrees or about 180 degrees. The shear angle is about 0 degrees or about 180 degrees where the rotating pressure force is aligned with the direction of displacement or opposed to the direction of displacement, respectively. When the shear angle is about 0 degrees or about 180 degrees, then the oil acts as a stiffener, which causes the squeeze-film damper to enhance, rather than damp, the vibrations transmitted from the rotatable shaft. To reduce transmission through the oil film, the valve on passage 42 can optionally be switched to an off position, whereby the supply of oil through passage 42 is ceased. Eliminating the supply of oil to annulus 28 prevents the squeeze-film damper from transmitting vibrations. However, the rotating shaft continues to generate vibrations that are transmitted through squirrel cage 12.

Damping layer 32 is disposed about at least one of the plurality of ligaments 22. The rotating shaft rotates and ligaments 22 are strained as squirrel cage 12 vibrates within the bearing compartment. As ligaments 22 strain, damping layer 32 provides damping to squirrel cage 12. Because the vibrations are not transmitted through the squeeze-film damper, due to the valve being switched to an off position to cease the supply of oil to annulus 28 through passage 42, the vibrations are transmitted through squirrel cage 12. As the vibrations pass through squirrel cage 12, ligaments 22 are strained and damping layer 32 provides damping.

Damping layer 32 preferably includes a viscoelastic material covering at least one ligament 22. It is understood, however, that damping layer 32 may include viscoelastic material, such as a constrained layer viscoelastic material, a damping tape, a plasma spray coating, of any other damping material suitable for dissipating the vibrations through ligaments 22. For example, the damping tape may optionally include a viscoelastic damping material having a metallic backing. Additionally, damping layer 32 may be applied to ligaments 22 in any suitable manner, such as by wrapping a damping tape around ligament 22, spray coating damping layer 32 on ligaments 22, masking one or both ends of squirrel cage 12 and dipping squirrel cage 12 in the damping material to coat ligaments 22 in damping layer 32, or by any other suitable manner.

Figure 2:
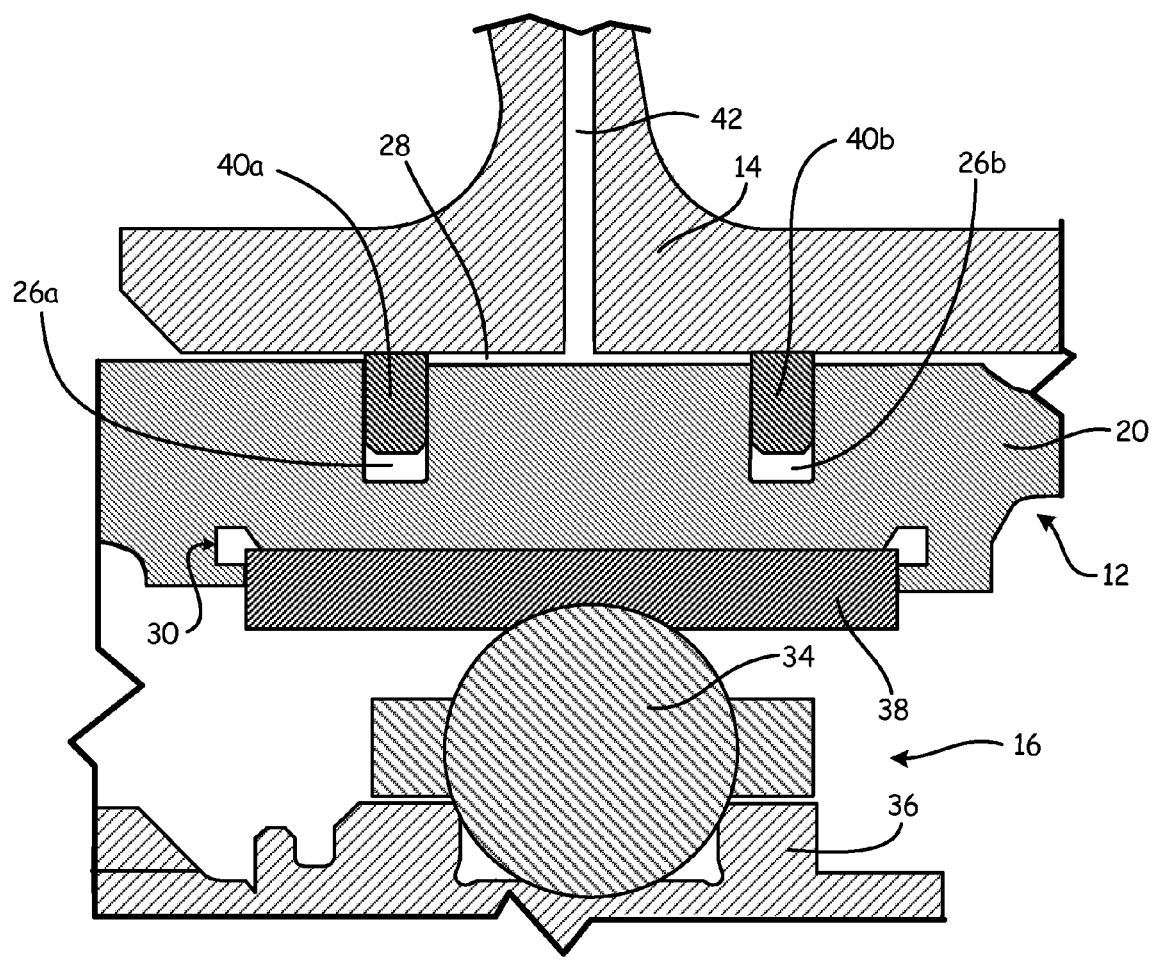
FIG. 2 is a cross-sectional view of a squeeze-film damper bearing assembly.

FIG. 2 is a zoomed-in cross-sectional view of the squeeze-film damper of FIG. 1. FIG. 2 illustrates squirrel cage 12, stationary housing 14, and bearing assembly 16. Second end 20, which includes piston ring grooves 26a and 26b, annulus 28, and race housing 30, of squirrel cage 12 is illustrated. Bearing assembly 16 includes bearing element 34, inner race 36, and outer race 38. Piston rings 40a and 40b are also illustrated. As illustrated, squirrel cage 12, stationary housing 14, and bearing assembly 16 form a squeeze-film damper.

Squirrel cage 12 supports bearing assembly 16, and squirrel cage 12 is supported by stationary housing 14. Bearing assembly 16 supports a rotatable shaft, such as a compressor or turbine shaft of a gas turbine engine. Piston ring grooves 26a and 26b extend circumferentially about an outer surface of second end 20. Annulus 28 is disposed between piston ring grooves 26a and 26b and similarly extends circumferentially about an outer surface of second end 20. Race housing 30 extends circumferentially about an inner surface of second end 20. Race housing 30 supports outer race 38 of bearing assembly 16. Piston rings 40a and 40b in piston ring grooves 26a and 26b respectively and provide a seal between squirrel cage 12 and stationary housing 14, defining annulus 28.

Passage 42 extends through stationary housing 14 and fluidly connects an oil supply to annulus 28. As previously discussed, a valve controls a supply of oil provided to annulus 28 through passage 42. The oil is retained in annulus 28 by squirrel cage 12, piston rings 40a and 40b, and stationary housing 14. As the shaft rotates, vibrations experienced by the shaft are transmitted to stationary housing 14 through bearing assembly 16. The oil is squeezed within annulus 28 by the motion of squirrel cage 12, which cause the oil to damp the vibration of the rotatable shaft. To damp vibrations, the oil shears within annulus 28, preferably having a shear angle of about 90 degrees. During operation the oil slowly leaks out of annulus 28 through gaps in piston rings 40a and 40b. As such, a constant supply of oil must be provided to annulus 28 to maintain the squeeze-film damper.

During acceleration, the rotating shaft passes through several critical speeds. A critical speed is experienced when the rotating shaft rotational frequency traverses a resonance frequency of one of the various structure of the engine. Due to the multitude of structures that make up any given engine, the rotating shaft can pass through several different critical speeds during acceleration. The oil disposed within annulus 28 shears as the rotating shaft rotates to damp vibrations. To effectively damp vibrations, the oil preferably has a shear angle of about 90 degrees. However, the oil acts as a stiffener when the shear angle is about 0 degrees or about 180 degrees. When the shear angle is about 0 degrees or about 180 degrees, then the oil can cause vibrations to be transmitted to stationary housing 14 and other engine structures. To reduce the transmission of vibrations through the oil film, the valve disposed on passage 42 is switched to an off position and the supply of oil to annulus 28 is ceased. Once the supply of oil is shut off, vibrations are no longer transmitted through squeeze-film damper. Instead, the vibrations are transmitted through squirrel cage 12.

Figure 3:
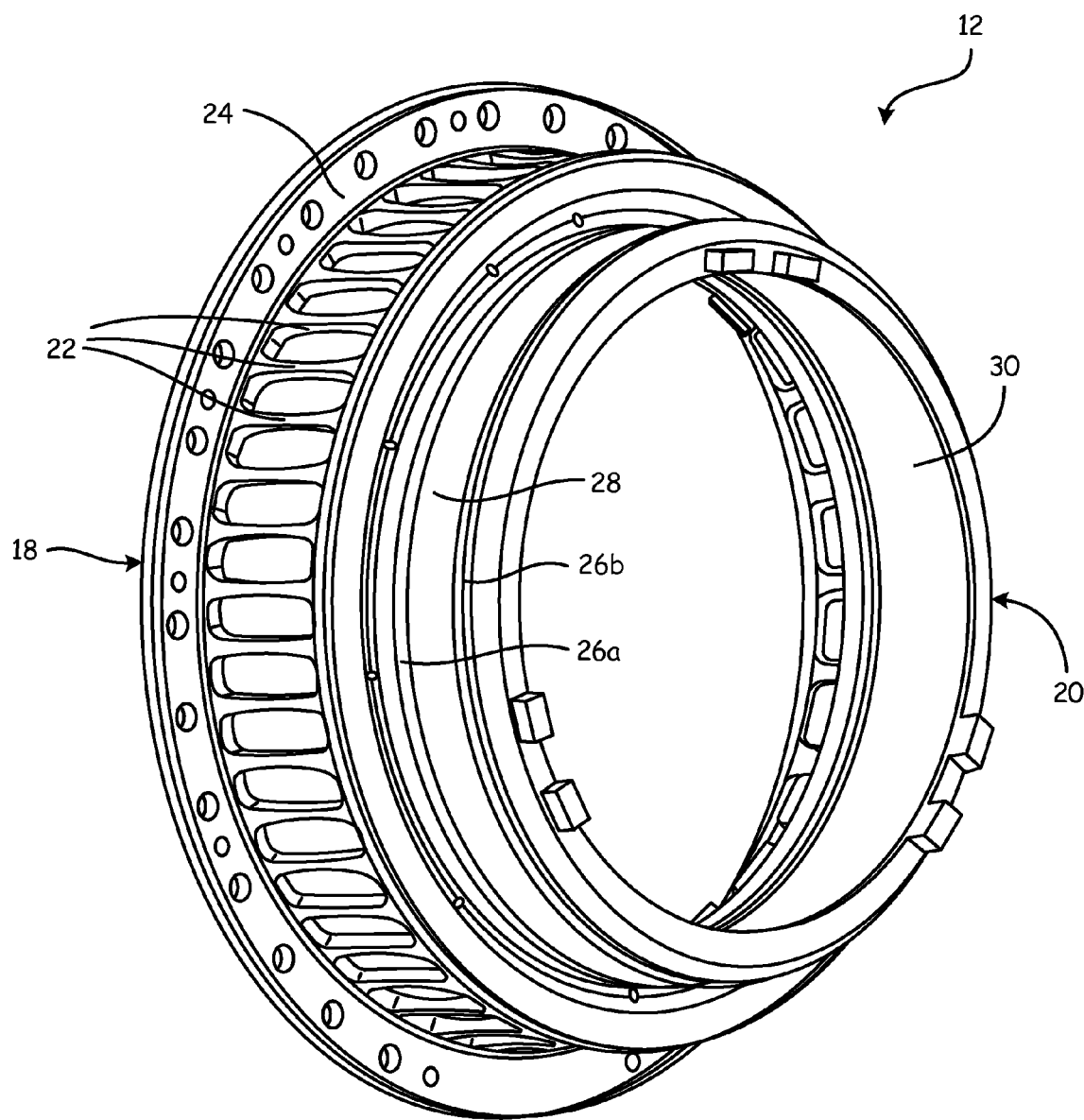
FIG. 3 is a perspective view of a squirrel cage of the bearing support assembly in FIG. 1.

FIG. 3 is a perspective view of squirrel cage 12. Squirrel cage 12 includes first end 18, second end 20, and ligaments 22. First end 18 includes mounting flange 24. Second end 20 includes piston ring grooves 26a and 26b, annulus 28, and race housing 30. Ligaments 22 include damping layer 32 (best seen in FIG. 1).

Ligaments 22 extend between and connect first end 18 and second end 20. Mounting flange 24 extends radially outward from ligaments 22. Mounting flange 24 includes a plurality of fastener openings extending therethrough, the fastener openings are capable of receiving fasteners, the fasteners securing squirrel cage 12 to stationary housing 14 (best seen in FIG. 1). Damping layer 32 is disposed on at least one ligament 22. Piston ring grooves 26a and 26b extend circumferentially about an outer surface of second end 20. Annulus 28 similarly extends circumferentially about an outer surface of second end 20, and annulus 28 is disposed between piston ring groove 26a and piston ring groove 26b. Race housing 30 extends circumferentially about an inner surface of second end 20. Squirrel cage 12 is preferably metallic, and is preferably made from titanium, a titanium alloy, nickel, or a nickel alloy. During operation, squirrel cage 12 is bathed in oil that is typically about 350° F. (177° C.), and squirrel cage 12 is thus made of a material that can withstand such temperatures.

As the rotatable shaft vibrates, vibrations are transmitted to squirrel cage 12 through bearing assembly 16. As previously discussed, the vibrations can be damped by a squeeze-film damper, whereby supply of oil provided to annulus 28 acts as a damper. However, the oil may act as a stiffener and transmit vibrations to an engine casing during certain operational speeds of the engine. When the oil acts as a stiffener, the supply of oil provided to annulus 28 is shut off and vibrations are transmitted directly through squirrel cage 12. For example, the squeeze-film damper can damp vibrations until the engine reaches an idle speed, at which point the supply of oil is shut off. However, the supply of oil may be resumed at any point during operation of the engine where the squeeze-film damper provides damping, not stiffness. As such, squirrel cage 12 must damp the vibrations transmitted from the rotatable shaft when the supply of oil to annulus 28 is ceased.

As the rotating shaft rotates, ligaments 22 are strained as squirrel cage 12 vibrates within bearing compartment 10. As ligaments 22 strain, damping layer 32 provides damping of any vibrations experienced through ligaments 22. The vibrations pass through squirrel cage 12 and damping layer 32 provides damping to reduce the transmissibility of vibrations to the engine structure.

Damping layer 32 preferably includes a viscoelastic material covering at least one ligament 22. While damping layer 32 may include a viscoelastic material, such as a constrained layer viscoelastic material, damping layer 32 may also include a damping tape, such as a damping tape having a viscoelastic adhesive and a metallic or composite backing, a plasma spray coating, or any other damping material suitable for dissipating the vibrations through ligaments 22. Additionally, damping layer 32 may be applied to ligaments 22 in any suitable manner, such as by wrapping a damping tape around ligament 22, spray coating damping layer 32 on ligaments 22, masking one or both ends of squirrel cage 12 and dipping squirrel cage 12 in the damping material to coat ligaments 22 in damping layer 32, via electron beam physical vapor deposition, or by any other suitable manner. Squirrel cage 12 is bathed in oil that is typically about 350° F. (177° C.) during operation. Damping layer 32 thus is made of a material capable of damping vibrations at such temperatures.

Discussion of Possible Embodiments

The following are non-exclusive descriptions of possible embodiments of the present invention.

A bearing centering spring includes a first end, a second end, a plurality of ligaments extending between and connecting the first end and the second end, and a damping layer disposed on at least one of the plurality of ligaments.

The bearing centering spring of the preceding paragraph can optionally include, additionally and/or alternatively, any one or more of the following features, configurations and/or additional components:

A constrained layer viscoelastic material.

A plasma spray coating.

A damping tape.

A viscoelastic polymer adhesive and a backing material attached to the viscoelastic polymer adhesive.

A metallic backing.

A damping assembly includes a bearing; a squirrel cage disposed radially outward of and supporting the bearing, the squirrel cage including a first end, a second end, the second end supporting the bearing, a plurality of ligaments extending between and connecting the first end and the second end, and a damping layer disposed on at least one of the plurality of ligaments; and a housing disposed radially outward of the squirrel cage.

The damping assembly of the preceding paragraph can optionally include, additionally and/or alternatively, any one or more of the following features, configurations and/or additional components.

A first piston ring disposed between the squirrel cage and the housing, a second piston ring disposed between the squirrel cage and the housing, an annulus defined by the squirrel cage, the housing, the first piston ring, and the second piston ring, and an oil feed to the annulus.

A valve attached to the oil feed.

The valve remains in an open position during engine start up.

The valve is switched from the open position to a closed position after an engine speed reaches an idle speed.

The bearing is a thrust bearing.

A constrained layer viscoelastic material.

A plasma spray coating.

A damping tape.

A viscoelastic polymer adhesive and a metallic backing.

A method of damping vibrations in a gas turbine engine includes damping engine vibrations with a damping layer disposed on at least one ligament of a squirrel cage, the squirrel cage supporting a bearing outer race; supplying oil to an annulus disposed between the squirrel cage and a housing; damping engine vibrations with the oil; and switching off an oil supply to the annulus when the engine speed is at least an idle speed of the engine, whereby the engine vibrations transmitted through the bearing outer race are damped exclusively by the squirrel cage.

The method of the preceding paragraph can optionally include, additionally and/or alternatively, any one or more of the following features, configurations and/or additional components.

Damping engine vibrations with a damping layer sprayed onto the squirrel cage.

Damping engine vibrations with a damping tape wrapped around at least one ligament of the squirrel cage.

Damping engine vibrations with a damping layer applied to the squirrel cage by masking at least one end of the squirrel cage and immersing the squirrel cage in a material having damping properties.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A bearing centering spring comprising:
   a first end;
   a second end;
   a plurality of ligaments extending between and connecting the first end and the second end; and
   a damping layer disposed on at least one of the plurality of ligaments, such that the damping layer extends along the at least one of the plurality of ligaments but does not span a gap disposed between adjacent ones of the plurality of ligaments.

2. The bearing centering spring of claim 1, wherein the damping layer comprises:
   a constrained layer viscoelastic material.

3. The bearing centering spring of claim 1, wherein the damping layer comprises:
   a plasma spray coating.

4. The bearing centering spring of claim 1, wherein the damping layer comprises:
   a damping tape.

5. The bearing centering spring of claim 4, wherein the damping tape further comprises:
   a viscoelastic polymer adhesive; and
   a backing material attached to the viscoelastic polymer adhesive.

6. The bearing centering spring of claim 5, wherein the backing material comprises a metallic material.

7. A damping assembly comprising:
   a bearing;
   a squirrel cage disposed radially outward of and supporting the bearing, the squirrel cage comprising:
      a first end;
      a second end, the second end supporting the bearing;
      a plurality of ligaments extending between and connecting the first end and the second end; and
      a damping layer disposed on at least one of the plurality of ligaments, such that the damping layer extends along the at least one of the plurality of ligaments but does not span a gap disposed between adjacent ones of the plurality of ligaments; and
   a housing disposed radially outward of the squirrel cage.

8. The damping assembly of claim 7, and further comprising:
   a first piston ring disposed between the squirrel cage and the housing;
   a second piston ring disposed between the squirrel cage and the housing;
   an annulus defined by the squirrel cage, the housing, the first piston ring, and the second piston ring; and
   an oil feed to the annulus.

9. The damping assembly of claim 8, and further comprising:
   a valve attached to the oil feed.

10. The damping assembly of claim 9, wherein the valve remains in an open position during engine start up.

11. The damping assembly of claim 10, wherein the valve switches to a closed position after an engine speed exceeds an idle speed.

12. The damping assembly of claim 7, wherein the bearing comprises a thrust bearing.

13. The damping assembly of claim 7, wherein the damping layer comprises:
    a constrained layer viscoelastic material.

14. The damping assembly of claim 7, wherein the damping layer comprises:
    a plasma spray coating.

15. The damping assembly of claim 7, wherein the damping layer comprises:
    a damping tape.

16. The damping assembly of claim 15, wherein the damping tape further comprises:
    a viscoelastic polymer adhesive; and
    a metallic backing.

17. A method of damping vibration in a gas turbine engine comprising:
    damping engine vibrations with a damping layer disposed on at least one ligament of a squirrel cage, the squirrel cage supporting a bearing outer race, wherein the damping layer is applied to the squirrel cage by masking at least one end of the squirrel cage and immersing the squirrel cage in a material having damping properties;
    supplying oil to an annulus disposed between the squirrel cage and a housing;
    damping engine vibrations with the oil; and
    switching off an oil supply to the annulus when the engine speed is at least at idle speed of the engine, whereby the engine vibrations transmitted through the bearing outer race are damped exclusively by the squirrel cage.

* * * * *